US008273689B2

(12) United States Patent
Otto et al.

(10) Patent No.: US 8,273,689 B2
(45) Date of Patent: Sep. 25, 2012

(54) METHOD FOR LUBRICATING AND/OR REDUCING CORROSION OF DRILLING EQUIPMENT

(75) Inventors: Michael J. Otto, Cypress, TX (US);
James E. Norfleet, Magnolia, TX (US);
Dennis K. Clapper, Houston, TX (US);
Kalyan C. Singamshetty, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1808 days.

(21) Appl. No.: 10/792,056

(22) Filed: Mar. 3, 2004

(65) Prior Publication Data

US 2005/0197255 A1 Sep. 8, 2005

(51) Int. Cl.
*C09K 8/04* (2006.01)
*C09K 8/06* (2006.01)

(52) U.S. Cl. ......... 507/138; 507/103; 507/120; 507/121

(58) Field of Classification Search .................. 508/539; 507/138
See application file for complete search history.

(56) References Cited

U.S. PATENT DOCUMENTS

| 3,047,494 A | 7/1962 | Browning |
| 3,048,538 A | 8/1962 | Rosenberg et al. |
| 3,761,410 A | 9/1973 | Mondshine et al. |
| 3,840,460 A | 10/1974 | Sheldahl et al. |
| 4,280,915 A | 7/1981 | Kercheville |
| 4,293,427 A | 10/1981 | Lucas et al. |
| 4,525,285 A * | 6/1985 | Son et al. .......... 507/131 |
| 4,631,136 A * | 12/1986 | Jones, III .......... 507/138 |
| 5,618,780 A | 4/1997 | Argillier et al. |
| 5,658,860 A | 8/1997 | Clark et al. |
| 5,776,867 A | 7/1998 | Przybylski et al. |
| 6,110,877 A | 8/2000 | Roberts |
| 6,403,537 B1 | 6/2002 | Chesser et al. |
| 6,448,207 B1 * | 9/2002 | Fukutani et al. ............. 508/175 |
| 6,849,581 B1 * | 2/2005 | Thompson et al. ........... 507/118 |

OTHER PUBLICATIONS

Witco Corporation—Organics Divison, Metallic stearates and metal organics, Product Guide, 1991, Perth Amboy, New Jersey.
PCT, International Search Report and Written Opinion, PCT/US2005/006093, Jun. 20, 2005.
The Morris Law Firm, P.C., Article 19 Claim Amendments, PCT/US2005/006093, Aug. 18, 2005.
"Exhibit A" Expotech USA, "Model 212 EP/Lubricity Tester Instruction Manual," Part No. 211210001EA Rev. D.

* cited by examiner

*Primary Examiner* — Ellen McAvoy
(74) *Attorney, Agent, or Firm* — The Morris Law Firm, P.C.; Paula D. Morris

(57) ABSTRACT

Lubricants and drilling fluid systems comprising lubricants which form a coherent lubricating film on metal equipment, thereby prolonging equipment life even under a wide variety of conditions, including high temperature and/or high pressure conditions.

29 Claims, 3 Drawing Sheets

2(a) 2(b)

METHOD FOR LUBRICATING AND/OR REDUCING CORROSION OF DRILLING EQUIPMENT

FIELD OF THE INVENTION

The present application relates to lubricants that are useful in "drilling fluid systems" under a wide variety of conditions, including high temperature and/or high pressure conditions. The lubricants preferably react with the surface of metal equipment to form a coherent lubricating film, thereby prolonging equipment life. The application also relates to drilling fluid systems comprising such lubricants.

BACKGROUND OF THE INVENTION

A substantial portion of the time required for drilling operations is consumed in replacing drill bits. Excessively high torque and drag may cause excessively costly delays or interruptions in drilling operations. The surfaces of the metal equipment also wear down due to frictional forces, resulting in reduced equipment life. These problems generally increase at high temperatures and/or high pressures.

BRIEF SUMMARY

The present application provides lubricants for drilling fluid systems comprising a dispersion comprising at least one fatty acid soap comprising at least one alkali metal, said fatty acid soap being dispersed in a carrier fluid.

The application also provides drilling fluid systems comprising a dispersion comprising at least one fatty acid soap comprising at least one alkali metal, said fatty acid soap being dispersed in a continuous phase of said drilling fluid system in a quantity effective to form a coherent lubricating film on metal surfaces exposed to said dispersion.

The application also provides a method of prolonging life of drilling equipment comprising exposing at least one metal surface of said drilling equipment to a dispersion comprising at least one fatty acid soap comprising at least one alkali metal dispersed in a continuous phase of said fluid system, said dispersion comprising a quantity effective to produce a coherent lubricating film on said metal surface.

BRIEF DESCRIPTION OF THE FIGURES

FIG. 2a shows the rust coated nail and coupon that were heat aged in the untreated base fluid and then exposed to the atmosphere for seven (7) months. FIG. 2b shows the coupon and nail that were heat aged in the mud treated with lubricant and exposed to the same conditions.

DETAILED DESCRIPTION

Figure 1A:
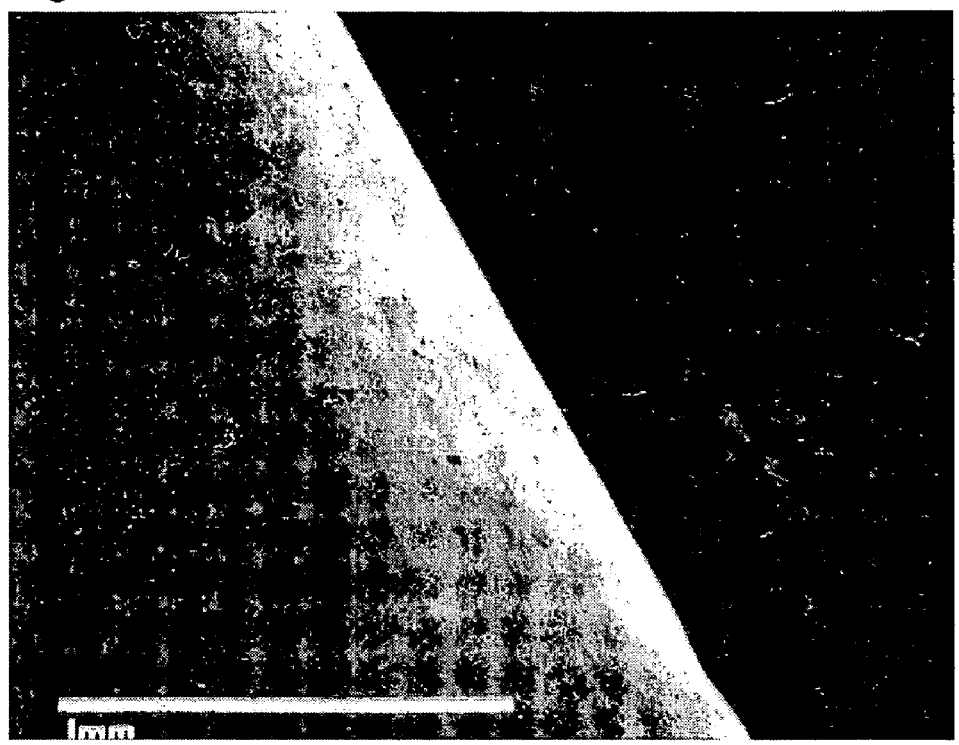
FIGS. 1A and 1B are Scanning Electron Micrographs of a nail heat aged in a field mud which did not contain the lubricant.

The present application relates to "drilling fluid systems," defined as fluid systems or components thereof which are "useful during drilling operations." "Drilling fluid systems" include but are not necessarily limited to systems that are useful during "drilling," "drill-in," "completion," "workover," and "cementing" operations. Preferred "drilling fluid systems" are drilling and drill-in fluid systems.

The lubricants are compatible with a variety of fluid systems in current use, and provide effective and consistent lubricating properties even at high pressures and/or high temperatures. The lubricants comprise fatty acid soaps of alkali metals (sometimes simply called "fatty acid soaps") effective to form a coherent lubricating film on the metal. The film preferably covers metal surfaces to which it is exposed, or is "substantially continuous."

Previous lubricants, sometimes called boundary lubrication additives, generally used fatty acid soaps of metals having a relatively high valence, such as aluminum. Most current drilling fluid systems comprise polymeric materials which tend to react with metals having valences greater than 1. The reaction between the polymeric material and a high valence metal in a fatty acid soap adversely affects drilling fluid properties.

The metals of the fatty acid soaps used in the present lubricants have a lower valence. These low valence metals do not tend to react with polymers used in current systems, and successfully form an effective lubricating film on metal equipment to which the lubricant is exposed. As a result, merely including the lubricant in a drilling fluid system extends the life of the drill string and casing.

The metal surfaces on which the lubricant film is formed comprise a variety of metals, preferably the various types of steels used to construct equipment used during drilling operations. Without limiting the present invention to a particular theory or mechanism of action, unless specified in a claim, it is believed that the fatty acid soap reacts with the metal surface to form a substantially continuous lubricating film.

The resulting lubricating film provides effective lubrication to metal surfaces subject to friction, such as the metal surfaces of a drill bit or other bearing surfaces, even under high temperature, high pressure conditions. Using a fluid system comprising the lubricant reduces torque and drag, prolongs bit bearing life, reduces friction wear between metal surfaces, e.g. between the drill string and the casing, and reduces corrosion.

In order for the lubricant to function effectively in a wide variety of drilling fluid systems, the fatty acid soap preferably is maintained in a wide variety of continuous phases as a "dispersion." Additives or conditions which cause flocculation, coalescence, or otherwise destroy the stable dispersion of the fatty acid soap in the continuous phase are avoided.

In order to ensure that the fatty acid soap remains as a dispersion, the fatty acid soap preferably is insoluble in the base fluid of the fluid system being treated. Such base fluids typically comprise oil, water, and solutions comprising oil and/or water base, including but not necessarily limited to brines. Preferred fluid systems are water-based fluid systems. Preferably, the soap dispersion formed in the fluid has thermal stability at temperatures of 250° F. or more. More preferably, when added to the fluid system, the soap dispersion has thermal stability at temperatures of about 300° F. or more, even more preferably at temperatures of about 450° F. or more.

As used herein, the term "oil" includes, but is not necessarily limited to conventional organic fluids used in formulating drilling fluid systems and additives therefor. Examples of "oils" include but are not necessarily limited to olefins, paraffins, water insoluble polyglycols, water insoluble esters, water insoluble Fischer-Tropsch reaction products, and other liquid organic materials, and combinations thereof. Suitable olefins are branched and/or linear and preferably are relatively non-toxic synthetic olefins. Examples of preferred olefins include but are not necessarily limited to polyalphaolefins, linear alpha olefins, and internal olefins, typically skeletally isomerized olefins. Most preferred olefins are described in U.S. Pat. Nos. 5,605,872 and 5,851,958, incorporated herein by reference. Preferred paraffins are described in U.S. Pat. No. 5,837,655, incorporated herein by reference. Suitable polyglycols have a molecular weight sufficiently high to render them water insoluble. Preferred polyglycols are water insoluble polypropylene glycols. A most preferred polyglycol has a number average molecular weight of about 2000 or more, more preferably about 4000 or more. Suitable organic materials are available from a variety of commercial sources.

Suitable fatty acid soaps for use in the fluid systems include, but are not necessarily limited to fatty acid soaps of alkali metals. Suitable alkali metals for use in the fatty acid soaps have a valence of 1. Such metals include, but are not necessarily limited to lithium, sodium, potassium, rubidium, and cesium. More preferred alkali metals are selected from the group consisting of lithium, sodium, and potassium. A most preferred alkali metal is lithium.

The fatty acid in the metal soap comprises saturated or unsaturated monocarboxylic acid compounds having the following general structure:

wherein R is selected from the group consisting of alkyl groups and alkenyl groups having from about 10 to about 28 carbon atoms, preferably from about 16 to about 24 carbon atoms, even more preferably from about 16 to about 20 carbon atoms. Said alkenyl groups comprise from about 0 to about 4, preferably from about 0 to about 2 unsaturated carbon-carbon bonds.

Examples of suitable fatty acids for use in the fatty acid soaps include, but are not necessarily limited to fatty acids occurring in animal and vegetable fats. More particular examples of suitable fatty acids include, but are not necessarily limited to tall oil fatty acids, stearic acids, palmitic acids, oleic acids, and fatty acids derived from castor oil, coconut oil, cotton-seed oil, rice oil, soybean oil, lard oil, rosin acids, tall oils, and the like, and combinations thereof. More preferred fatty acids are stearic acid, palmitic acid, and myristic acid. Most preferred fatty acids are stearates. Since the valence of the metal is 1, the metal generally is complexed with 1 molecule of fatty acid per metal atom. Most preferred fatty acid soaps are lithium stearates.

The fluid system comprises a sufficient quantity of the fatty acid soap to react with metal surfaces in the drill string and casing, particularly load bearing surfaces, to form a substantially continuous coherent lubricating film. Typically, this will require a quantity of from about 0.01 to about 10 vol. % of the fatty acid soap, more preferably from about 2 to about 5 vol. %.

The lubricant comprises a dispersion of the fatty acid soap in a carrier. A variety of carriers may be used including, but not necessarily water, oil, and/or aqueous solutions, such as brines. A preferred carrier is one or more glycol(s). Suitable glycols include, but are not necessarily limited to ethylene glycols, propylene glycols, polyethylene glycols, polypropylene glycols, ethylene glycol ethers, propylene glycol ethers, polyethylene glycol ethers and polypropylene glycol ethers having a number average molecular weight of about 2000 or less, preferably having a number average molecular weight about 1000 or less, and copolymers and combinations thereof. Preferred glycols are water soluble glycol ethers, preferably water soluble glycol ethers having a number average molecular weight of about 2000 or less, more preferably about 1000 or less. A most preferred glycol is AQUA-COL D™, available from Baker Hughes INTEQ.

A preferred extreme pressure lubricant is prepared by mixing the fatty acid soap comprising at least one alkali metal, preferably lithium stearate, with the carrier, preferably AQUA-COL D™, to achieve a maximum concentration of the fatty acid soap in the carrier while maintaining pourability. Where the fatty acid soap is lithium stearate, the maximum concentration of the lithium stearate is about 30 wt. %. The lubricant is prepared by simple mixing at low shear, for example using a Prince Castle mixer.

The lubricant may be used as an integral component of existing drilling fluid system formulations. The lubricant also may be added to a fluid system during drilling operations. For example, the lubricant may be injected into the pump suction, or may be added to a mud pit.

The fluid system in which the lubricant is used may be water-based or oil-based. Preferred fluid systems for use with the lubricant are water-based fluid systems. The phrase "water-based" includes any fluid system comprising water or a water-based solution as the continuous phase, including oil-in-water and oil-in-brine emulsions. The fluid systems of the present application also may be oil based. The phrase "oil-based" includes fluid systems comprising an "oil," as previously defined, as the continuous phase.

In order to be effective for use during drilling operations, the particular fluid system must have effective rheological and fluid loss control properties. Viscosity and fluid loss preferably are controlled in the fluid systems by adding certain polymers to the fluid. The fluid system preferably contains polymers that are capable of viscosifying the drilling fluid system and/or providing filtration control for the drilling fluid system. Preferred polymers are non-toxic and depend upon the base fluid. The lubricant is compatible with most additives used in high temperature mud systems, including acrylamide based polymers and copolymers.

Preferred water-based drilling fluid systems for use with the lubricant are "high temperature" drilling fluid systems comprising one or more monomers comprising acrylamide. Preferred high temperature drilling fluid systems comprise a combination of acrylamide alkyl alkane sulfonate(s) and dialkyl acrylamides, and combinations thereof, more preferably a combination of acrylamide methyl propane sulfonate (AMPS), dimethyl acryamide (DMA), and most preferably a combination thereof. A most preferred drilling fluid system is PYRO-DRILL®, which is commercially available from Baker Hughes INTEQ, Houston, Tex. Where the system is PYRO-DRILL®, preferred polymers include, but are not necessarily limited to MIL-TEMP®, PYRO-TROL®, ALL-TEMP®, KEM-SEAL®, and KEM-SEAL PLUS™, all of which are commercially available from Baker Hughes INTEQ.

PYRO-DRILL® is a flexible water-base drilling fluid that is used when temperature and/or contaminants make conventional water-base systems unstable or uneconomical. PYRO-DRILL® is designed to be thermally stable and resistant to contaminants. PYRO-DRILL® has been used in geothermal wells with bottom hole temperatures in excess of 600° F. Weighted fresh and salt water fluids have been used at temperatures approaching 500° F. PYRO-DRILL® fluids have been prepared in brines with magnesium concentrations exceeding 30,000 mg/L. Typical applications for "high temperature" water-based drilling fluid systems comprising acrylamide monomer(s), such as PYRO-DRILL®, include HTHP wells with BHT over 300° F., geothermal wells, and HTHP wells that drill through various salt sections including calcium and magnesium.

Conventional additives may be used in the fluid, including but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), penetration rate enhancer(s), corrosion inhibitor(s), acid(s), base(s), buffer(s), scavenger(s), gelling agent(s), soluble salts, biocides; one or more bridging and/or weighting agents may be added to the fluid, and combinations thereof. Suitable shale stabilizers include, but are not necessarily limited to glycols, inorganic salts, and encapsulating polymers, such as PHPA or acrylamide copolymers, alone or in aqueous solutions, and mixtures thereof. Suitable shale stabilizing inorganic salts include, but are not necessarily limited to alkali metal salts.

The fluid is prepared using conventional procedures. The fatty acid soap is effective at pH values of from 7 to about 13.5, preferably from about 8.5 to about 10. The pH of the drilling fluid may be adjusted with a suitable alkaline material, including but are not necessarily limited to alkali metal hydroxides and alkali metal acetates. Preferred alkali metal acetates include but are not necessarily limited to sodium acetate and potassium acetate. Preferred alkali metal hydroxides include, but are not necessarily limited to sodium hydroxide and potassium hydroxide. Preferred alkaline materials are selected from the group consisting of sodium hydroxide and potassium hydroxide, most preferably sodium hydroxide.

The invention will be better understood with reference to the following examples, which are illustrative only:

Example 1

Lubricant Preparation

An experimental lubricant was prepared comprising glycol as a carrier. The glycol selected for this test was AQUA-COL D™. To prepare the experimental lubricant the following procedure was followed:
1. 70 g of AQUA-COL D™ were measured into a 250 ml plastic beaker and placed on a Price Castle mixer;
2. 40 g lithium stearate was measured and sifted gradually into the AQUA-COL D™ solution while stirring at approximately 2500 RPM;
3. The mixture was stirred for approximately 10 minutes.

Lubricant Evaluation

Drilling Fluid Properties, Thermal Stability, Lubricity and Extreme Pressure Lubricity To evaluate the effectiveness of the lubricant, a field PYRO-DRILL® drilling fluid sample was conditioned with the lubricant at various concentrations. Initial drilling fluid rheology, filtration rates, and extreme pressure lubricity testing were conducted. The results are given below in Table I:

TABLE I

Initial Properties
Fluid Formulation

| Product | Concentration, lb/bbl Formulation | | | | |
|---|---|---|---|---|---|
| | 1 | 2 | 3 | 4 | 5 |
| Base Mud, bbl | 0.7 | 0.7 | 0.95 | 0.95 | 1.00 |
| Water, bbl | 0.2 | 0.2 | — | — | — |
| MIL-TEMP ® | 0.25 | 0.25 | — | — | — |

TABLE I-continued

Initial Properties
Fluid Formulation

| | 1 | 2 | 3 | 4 | 5 |
|---|---|---|---|---|---|
| KEM-SEAL PLUS ™ | 1 | 1 | — | — | — |
| PYRO-TROL ® | 1 | 1 | — | — | — |
| EXP. LUBE, bbl | 0.1 | 0.1 | 0.05 | 0.05 | — |
| MIL-GRAPHITE ™ | | 6 | — | — | — |
| MIL-BAR ™ | 22 | 22 | — | — | — |

Initial Properties
Test Properties

| | Formulation | | | | |
|---|---|---|---|---|---|
| | 1 | 2 | 3 | 4 | 5 |
| Fann Readings @ ° F. | 120 | 120 | 120 | 120 | 120 |
| 600 | 85 | 110 | 90 | 91 | 79 |
| 300 | 50 | 65 | 55 | 56 | 48 |
| 200 | 37 | 50 | 42 | 41 | 31 |
| 100 | 22 | 30 | 27 | 28 | 23 |
| 6 | 5 | 7 | 7 | 8 | 6 |
| 3 | 4 | 5 | 6 | 6 | 5 |
| Plastic Viscosity, cP | 35 | 45 | 35 | 35 | 31 |
| Yield Point, lb/100 ft$^2$ | 15 | 20 | 20 | 21 | 17 |
| Gel Strengths, lb/100 ft$^2$ | 5/11 | 5/15 | 7/14 | 8/13 | 5/16 |
| pH | 9.7 | 9.7 | 9.6 | 9.6 | 9.7 |
| API Filtrate, ml/30 min | 2.8 | 3.0 | 4.0 | 4.0 | 5.4 |
| Lubricity Coefficient | — | — | 0.15 | — | 0.2 |

In the foregoing formulations:
MIL-TEMP ® refers to thermal stabilizer;
KEM-SEAL PLUS ™ refers to a filtration control agent and fresh water viscosifier;
PYRO-TROL ® refers to filtration control agent, shale stabilizer, and lubricant;
MIL-GRAPHITE ™ refers to a graphite lubricant; and,
MIL-BAR ™ refers to barite weighting agent.

All of the foregoing products are commercially available from Baker Hughes INTEQ Drilling Fluids. The base mud was an actual sample of PYRO-DRILL® field mud.

Fluid properties were tested as according to API and Baker Hughes INTEQ ("BHI") Drilling Fluids standard procedures.

The base mud and the base mud treated with 5% by volume of the test lubricant were aged at 400° F. for 16 hours and retested. The results are given below in Table II:

TABLE II

Aged Properties
Samples aged 16 hours @ 450° F.

Test Properties

| | Formulation | | | | |
|---|---|---|---|---|---|
| | 1 | 2 | 3 | 4 | 5 |
| Fann Readings @ ° F. | — | — | 120 | — | 120 |
| 600 | — | — | 34 | — | 51 |
| 300 | — | — | 22 | — | 32 |
| 200 | — | — | 17 | — | 23 |
| 100 | — | — | 11 | — | 14 |
| 6 | — | — | 3 | — | 3 |
| 3 | — | — | 2 | — | 2 |
| Plastic Viscosity, cP | — | — | 12 | — | 19 |
| Yield Point, lb/100 ft$^2$ | — | — | 10 | — | 13 |
| Gel Strengths, lb/100 ft$^2$ | — | — | 3/10 | — | 4/5 |
| Ph | — | — | 9.4 | — | 9.5 |
| API Filtrate, ml/30 min | — | — | 4.8 | — | 5.4 |
| HTHP @ 300° F. | — | — | 15 | — | 14.8 |
| Lubricity Coefficient | — | — | 0.18 | — | 0.20 |

TABLE II-continued

Aged Properties
Samples aged 16 hours @ 450° F.

Extreme Pressure Lubricity Test Data

| | Formulation | | | | |
|---|---|---|---|---|---|
| | 1 | 2 | 3 | 4 | 5 |
| Sample Status | Initial | Initial | Aged | Initial | Initial |
| Applied Torque in-lb | 400 | 400 | 250 | 400 | 400 |
| Torque Rdg. 1 min | 47 | 33 | 20 | 40 | 38 |
| Torque Rdg. 2 min | 40 | 32 | 20 | 34 | 37 |
| Torque Rdg. 3 min | 35 | 26 | 20 | 30 | 34 |
| Torque Rdg. 4 min | 30 | 21.5 | 20 | 24 | 32 |
| Torque Rdg. 5 min | 27 | 19 | 20 | 21.5 | 30 |
| Scar Width, 0.1 inch | 12.6 | 13.5 | 8.9 | 12.8 | 18 |
| Film Strength, psi | 16920 | 15793 | 14923 | 16527 | 11844 |
| % Improvement in Film Strength/base | 30 | 25 | 26 | 28 | base |

The lubricity evaluations were performed using standard procedures and a Fann Lubricity tester.

TABLE III

Fluid Formulation

| Product | Concentration, ppb | |
|---|---|---|
| Formulation | Base | C |
| Water, bbl | .97 | 0.97 |
| MIL-GEL ™ | 15 | 15 |
| ALL-TEMP ® | 0.5 | 0.5 |
| KEM-SEAL PLUS ™ | 2 | 2 |
| PYRO-TROL ® | 2 | 2 |
| Caustic Soda | 0.1 | 0.1 |
| MIL-CARB ™ | 20 | — |
| DME | — | 3.5 |
| EXP. LUBE, bbl | — | 0.02 |

In the foregoing formulations:
ALL-TEMP ® refers to thermal stabilizer;
KEM-SEAL PLUS ™ refers to a filtration control agent and fresh water viscosifier;
PYRO-TROL ® refers to filtration control agent, shale stabilizer, and lubricant;
MIL-CARB ™ refers to a filtration control, bridging agent; and,
DME refers to a drilling mud emulsifier.

All of the foregoing products are commercially available from Baker Hughes INTEQ Drilling Fluids. The base mud was an actual sample of PYRO-DRILL® field mud.

These tests indicated that no adverse effects on drilling fluids were observed with the drilling fluid while a substantial improvement in lubricity (25 to 30%) was obtained.

Lubricant Coating, Scanning Electron Microscopy (SEM)

Figure 1B:
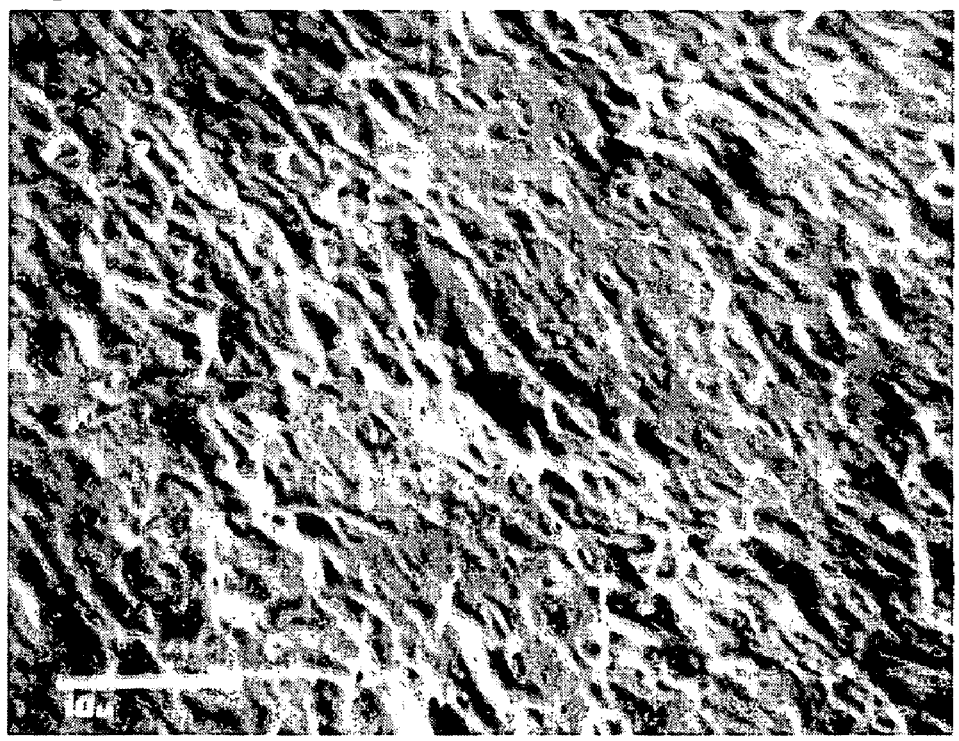
Figure 1C:
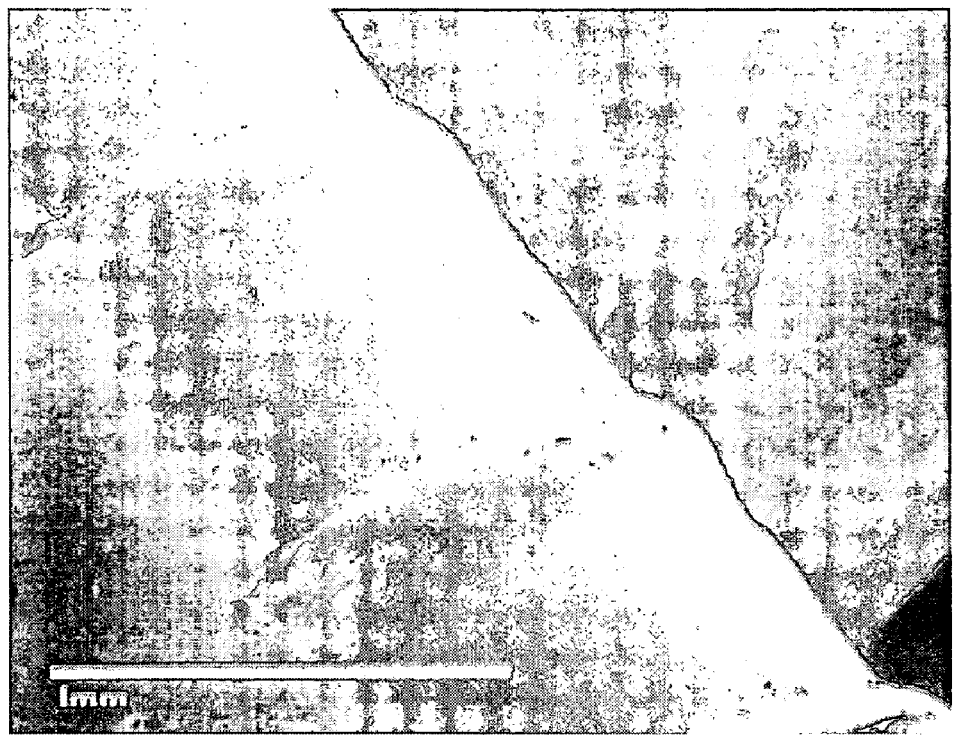
FIGS. 1C and 1D are Scanning Electron Micrographs at 20× and 2000×, respectively, of a nail heat aged in a field mud which did contain the lubricant.
Figure 1D:
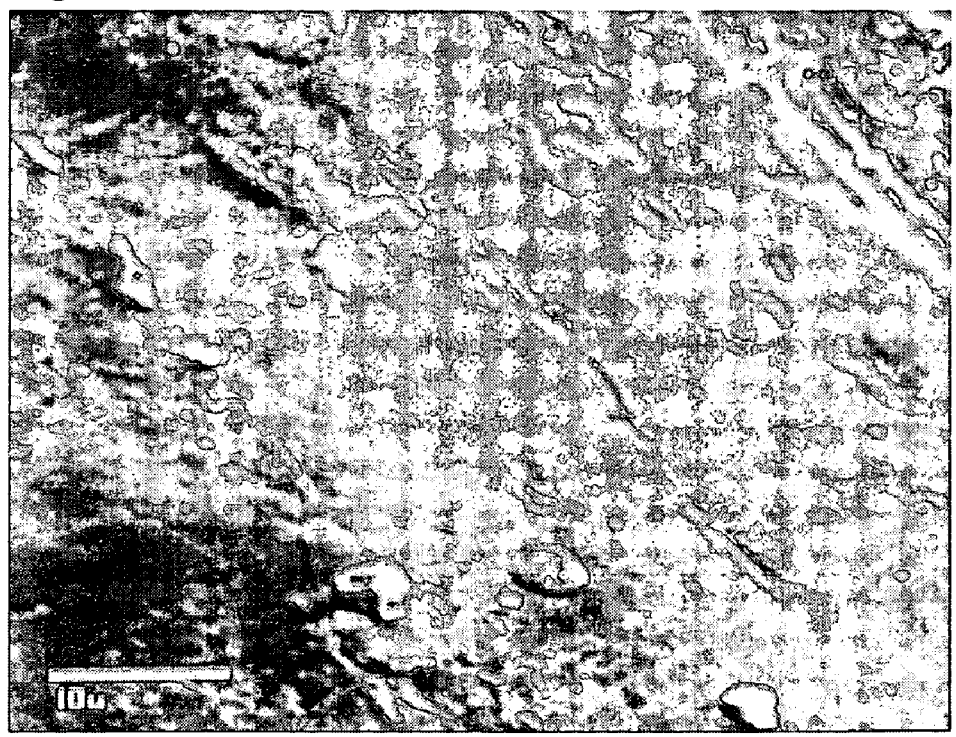

Nails were placed into the base mud and lubricant-treated mud sample prior to aging to evaluate the coating effects (sometimes called "bluing") of the test lubricant. The initial visual analysis revealed the nails that were aged in the lubricant-conditioned fluid to have a coating that the nails in the base fluid did not. These nails were viewed by scanning electron microscopy (SEM) which revealed that the nails exposed to the lubricant-conditioned fluid to have a significantly smoother surface than the nails in the unconditioned sample. FIGS. 1a-1d are SEM micrographs of the nails at 20× and 2000×. FIGS. 1a and 1b are SEM micrographs of the surface of nails exposed to the base fluid. FIGS. 1c and 1d are SEM micrographs of the surface of nails exposed to the lubricant-treated mud. This evaluation confirmed that the lubricant was providing a physical coating on exposed metal.

Example 2

Lubricant Preparation

Another evaluation with the experimental lubricant was prepared comprising a synthetic olefin as a carrier. The synthetic olefin selected for this test was ISO-TEQ™, comprised of $C_{14}$-$C_{18}$ olefins. To prepare the experimental lubricant the following procedure was followed:
1. 70 g ISO-TEQ was measured into a 250 ml plastic beaker and placed on a Price Castle mixer;
2. 40 g lithium stearate was measured and sifted gradually into the ISO-TEQ® while stirring at approximately 2500 RPM;
3. The resulting mixture was stirred for approximately 10 minutes.

Lubricant Evaluation

Photographs of Lubricant Coating

Figure 2:
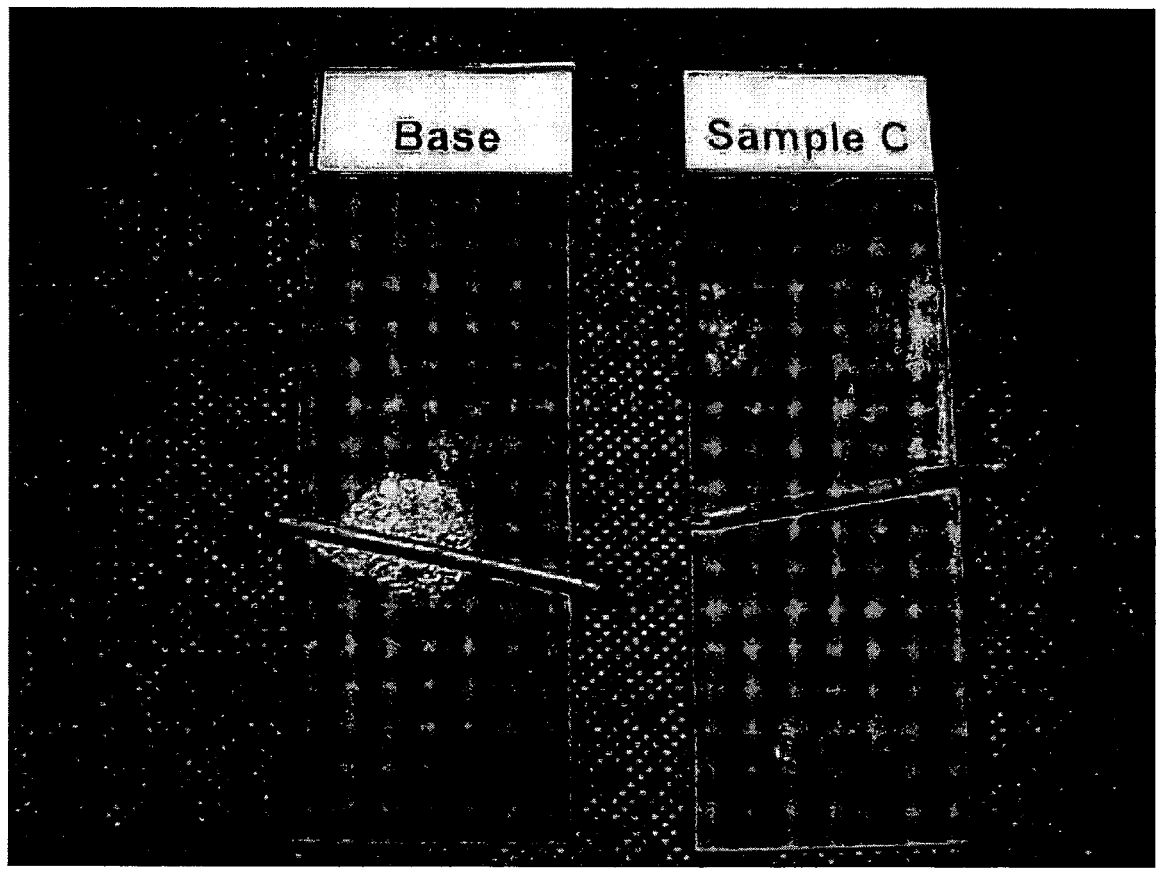
FIG. 2 consists of photographs from Example 2.

Nails and corrosion coupons were placed into the base mud and lubricant-treated mud samples prior to aging to evaluate the coating, i.e. "bluing," of the test lubricant on exposed metal. The visual analysis after aging revealed that the nails and coupons that were aged in the lubricant-conditioned fluid had a coating while the nails and coupons in the base fluid did not have a coating. The treated nails and coupons were exposed to the atmosphere for approximately seven (7) months prior to taking the photographs in FIG. 2a. The photographs display the protective coating and also there is little or no rust on the coupons and nails on samples exposed to lubricant-treated mud but a significant amount of rust formed on the samples exposed to the untreated base mud.

Persons of ordinary skill in the art will recognize that many modifications may be made to the foregoing without departing from the spirit and scope thereof. The embodiment described herein is meant to be illustrative only and should not be taken as limiting the invention, which is defined in the following claims.

We claim:

1. A method of providing extreme pressure lubrication of drilling equipment during drilling operations, the method comprising:
   providing a drilling fluid system having effective rheology and fluid loss control properties, the drilling fluid system comprising a continuous phase comprising as an integral component a dispersion comprising a quantity of insoluble fatty acid soap particles comprising alkali metal selected from the group consisting of lithium, potassium, rubidium, cesium, and combinations thereof; and,
   drilling through a subterranean formation using the drilling fluid system under conditions effective to maintain effective rheological properties and gel strengths and to maintain effective fluid loss control properties, and to react the insoluble fatty acid soap particles with one or more metal surfaces of drilling equipment in contact with the drilling fluid system, thereby producing lubricated drilling equipment comprising one or more metal surface comprising a substantially continuous lubricating film providing improved lubricity as reflected in an increase in lubricating film strength compared to a control during extreme pressure testing.

2. The method of claim 1 wherein the improved lubricity comprises an increase of 25% or more in lubricating film strength, measured in psi, compared to a control during extreme pressure testing.

3. The method of claim 1 wherein the dispersion remains thermally stable when the conditions comprise a temperature of 250° F. (121° C.).

4. The method of claim 1 wherein the dispersion remains thermally stable when the conditions comprise a temperature of 450° F. (232° C.).

5. A method of providing extreme pressure lubrication of drilling equipment during drilling operations, the method comprising:
providing a drilling fluid system having effective rheology and fluid loss control properties, the drilling fluid system comprising a continuous phase comprising as an integral component a dispersion comprising a quantity of insoluble lithium fatty acid soap particles; and,
drilling through a subterranean formation using the drilling fluid system under conditions effective to maintain effective rheological properties and gel strengths and to maintain effective fluid loss control properties, and to react the insoluble lithium fatty acid soap particles with one or more metal surfaces of drilling equipment in contact with the drilling fluid system, thereby producing lubricated drilling equipment comprising one or more metal surface comprising a substantially continuous lubricating film providing improved lubricity as reflected in an increase in lubricating film strength compared to a control during extreme pressure testing.

6. The method of claim 5 wherein the improved lubricity comprises an increase of 25% or more in lubricating film strength, measured in psi, compared to a control during extreme pressure testing.

7. The method of claim 6 wherein the dispersion remains thermally stable when the conditions comprise a temperature of 250° F. (121° C.).

8. The method of claim 6 wherein the dispersion remains thermally stable when the conditions comprise a temperature of 450° F. (232° C.).

9. The method of claim 6 wherein the drilling fluid system comprises an aqueous continuous phase.

10. A method of providing extreme pressure lubrication of drilling equipment during drilling operations, the method comprising:
providing a drilling fluid system having effective rheology and fluid loss control properties, the drilling fluid system comprising one or more polymers comprising one or more monomers comprising acrylamide and a continuous phase comprising as an integral component a dispersion comprising a quantity of insoluble fatty acid soap particles comprising alkali metal selected from the group consisting of lithium, potassium, rubidium, cesium, and combinations thereof,
drilling through a subterranean formation using the drilling fluid system under conditions effective to maintain effective rheological properties and gel strengths and to maintain effective fluid loss control properties, and to react the insoluble fatty acid soap particles with one or more metal surfaces of drilling equipment in contact with the drilling fluid system, thereby producing lubricated drilling equipment comprising one or more metal surface comprising a substantially continuous lubricating film providing improved lubricity, as reflected in an increase in lubricating film strength compared to a control during extreme pressure testing.

11. The method of claim 10 wherein the improved lubricity is demonstrated by an increase of 25% or more in lubricating film strength, measured in psi, compared to a control during extreme pressure testing.

12. The method of claim 11 wherein the continuous phase is aqueous.

13. The method of claim 11 wherein the alkali metal is lithium.

14. The method of claim 12 wherein the alkali metal is lithium.

15. The method of claim 11 wherein the dispersion remains thermally stable when the conditions comprise a temperature of 250° F. (121° C.).

16. The method of claim 11 wherein the dispersion remains thermally stable when the conditions comprise a temperature of 450° F. (232° C.).

17. The method of claim 11 wherein the polymer comprises a combination of one or more acrylamide alkyl alkane sulfonate monomers and one or more dialkyl acrylamide monomers.

18. The method of claim 11 wherein the polymer comprises a combination of acrylamide methyl propane sulfonate (AMPS) and dimethyl acryamide (DMA).

19. A method of providing extreme pressure lubrication of drilling equipment during drilling operations, the method comprising:
providing a drilling fluid system having effective rheology and fluid loss control properties, the drilling fluid system comprising a continuous phase comprising a dispersion comprising a quantity of insoluble lithium stearate particles,
drilling through a subterranean formation using the drilling fluid system under conditions effective to maintain effective rheological properties and gel strengths and to maintain effective fluid loss control properties, and to react the insoluble lithium stearate particles with one or more metal surfaces of drilling equipment in contact with the drilling fluid system, thereby producing lubricated drilling equipment comprising one or more metal surface comprising a substantially continuous lubricating film providing improved lubricity as reflected in an increase in lubricating film strength compared to a control during extreme pressure testing.

20. The method of claim 19 wherein the improved lubricity is demonstrated by an increase of 25% or more in lubricating film strength, measured in psi, compared to a control during extreme pressure testing.

21. The method of claim 20 wherein the continuous phase is aqueous.

22. The method of claim 20 wherein the dispersion remains thermally stable when the conditions comprise a temperature of 250° F. (121° C.).

23. The method of claim 20 wherein the dispersion remains thermally stable when the conditions comprise a temperature of 450° F. (232° C.).

24. The method of claim 21 wherein the dispersion remains thermally stable when the conditions comprise a temperature of 250° F. (121° C.).

25. The method of claim 21 wherein the dispersion remains thermally stable when the conditions comprise a temperature of 450° F. (232° C.).

26. The method of claim 20 further comprising providing the drilling fluid system with one or more polymers comprising acrylamide monomers while maintaining the effective rheological properties, gel strengths, and fluid loss control properties.

27. The method of claim 26 wherein the polymer comprises a combination of one or more acrylamide alkyl alkane sulfonate monomers and one or more dialkyl acrylamide monomers.

28. The method of claim 26 wherein the polymer comprises a combination of AMPS and DMA.

29. The method of claim 20 wherein the substantially continuous lubricating film reduces corrosion of the one or more metal surface.

* * * * *